No. 854,810. PATENTED MAY 28, 1907.
F. H. DANIELS.
METHOD FOR THE MANUFACTURE OF WIRE RODS.
APPLICATION FILED AUG. 3, 1906.

6 SHEETS—SHEET 1.

WITNESSES
R A Balderson
H M Corwin

INVENTOR
Fred H Daniels
by Bakewell Byrnes
his attys

No. 854,810. PATENTED MAY 28, 1907.
F. H. DANIELS.
METHOD FOR THE MANUFACTURE OF WIRE RODS.
APPLICATION FILED AUG. 3, 1906.

6 SHEETS—SHEET 2.

WITNESSES

INVENTOR

No. 854,810. PATENTED MAY 28, 1907.
F. H. DANIELS.
METHOD FOR THE MANUFACTURE OF WIRE RODS.
APPLICATION FILED AUG. 3, 1906.
6 SHEETS—SHEET 3.
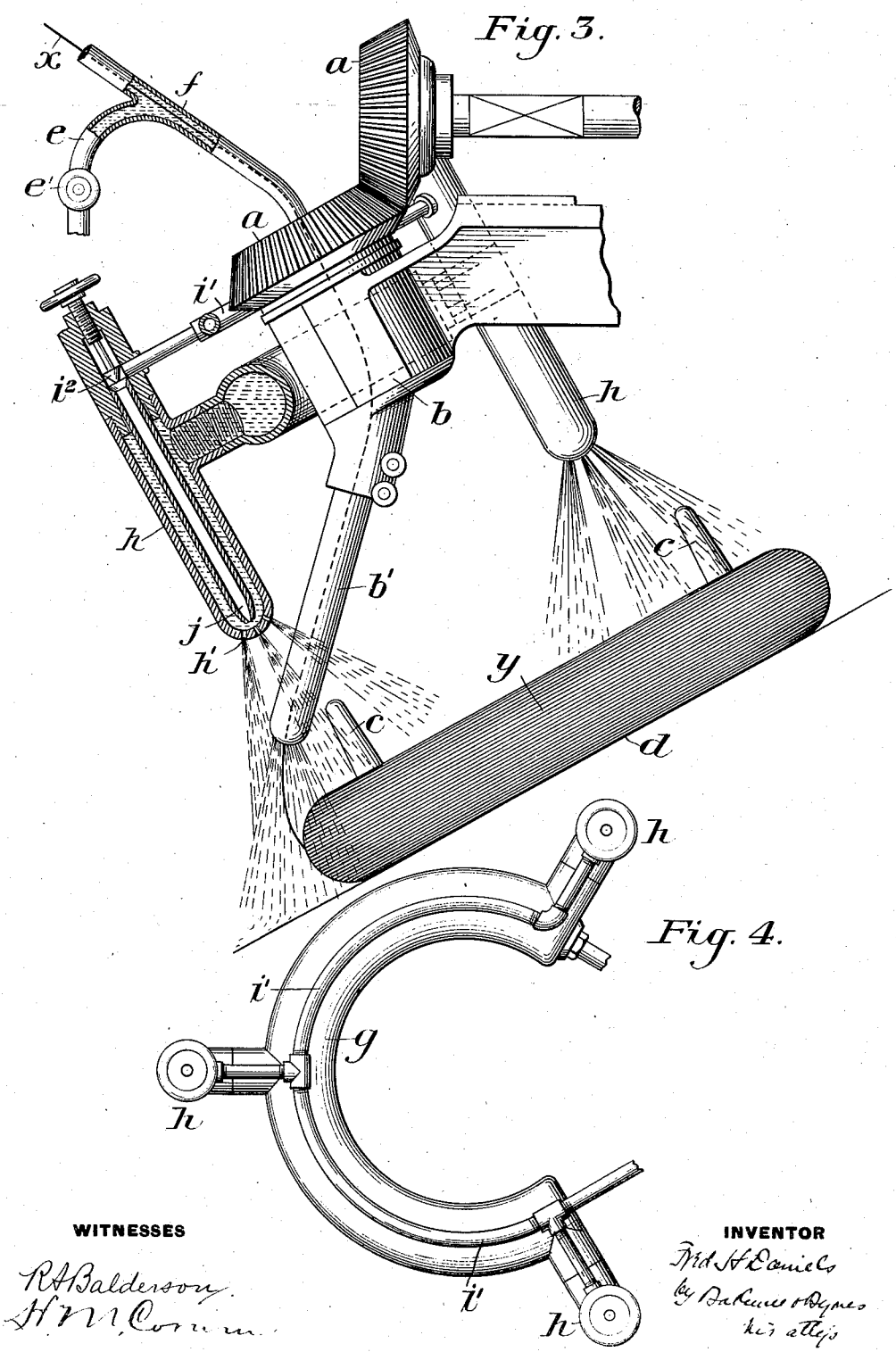
WITNESSES
INVENTOR No. 854,810. PATENTED MAY 28, 1907.
F. H. DANIELS.
METHOD FOR THE MANUFACTURE OF WIRE RODS.
APPLICATION FILED AUG. 3, 1906.

6 SHEETS—SHEET 4.

Fig. 5.

WITNESSES
R A Balderson
H M Corwin

INVENTOR
Fred H Daniels
by Tackner & Byrnes
his attys

No. 854,810. PATENTED MAY 28, 1907.
F. H. DANIELS.
METHOD FOR THE MANUFACTURE OF WIRE RODS.
APPLICATION FILED AUG. 3, 1906.

6 SHEETS—SHEET 5.

WITNESSES
R. J. Balderson
H. M. Corwin

INVENTOR
Fred H. Daniels
by Barker & Bynes
his attys

No. 854,810. PATENTED MAY 28, 1907.
F. H. DANIELS.
METHOD FOR THE MANUFACTURE OF WIRE RODS.
APPLICATION FILED AUG. 3, 1906.

6 SHEETS—SHEET 6.

WITNESSES
R A Balderson
H M Corwin

INVENTOR
Fred H Daniels
by Balderson & Haynes
his atty's

UNITED STATES PATENT OFFICE.

FRED H. DANIELS, OF WORCESTER, MASSACHUSETTS.

METHOD FOR THE MANUFACTURE OF WIRE RODS.

No. 854,810.  Specification of Letters Patent.  Patented May 28, 1907.

Application filed August 3, 1906. Serial No. 328,995.

*To all whom it may concern:*

Be it known that I, FRED H. DANIELS, of Worcester, county of Worcester, and State of Massachusetts, have invented a new and useful Method for the Manufacture of Wire Rods, of which the following is a specification, reference being had to the accompanying drawings, in which—

Figure 1:
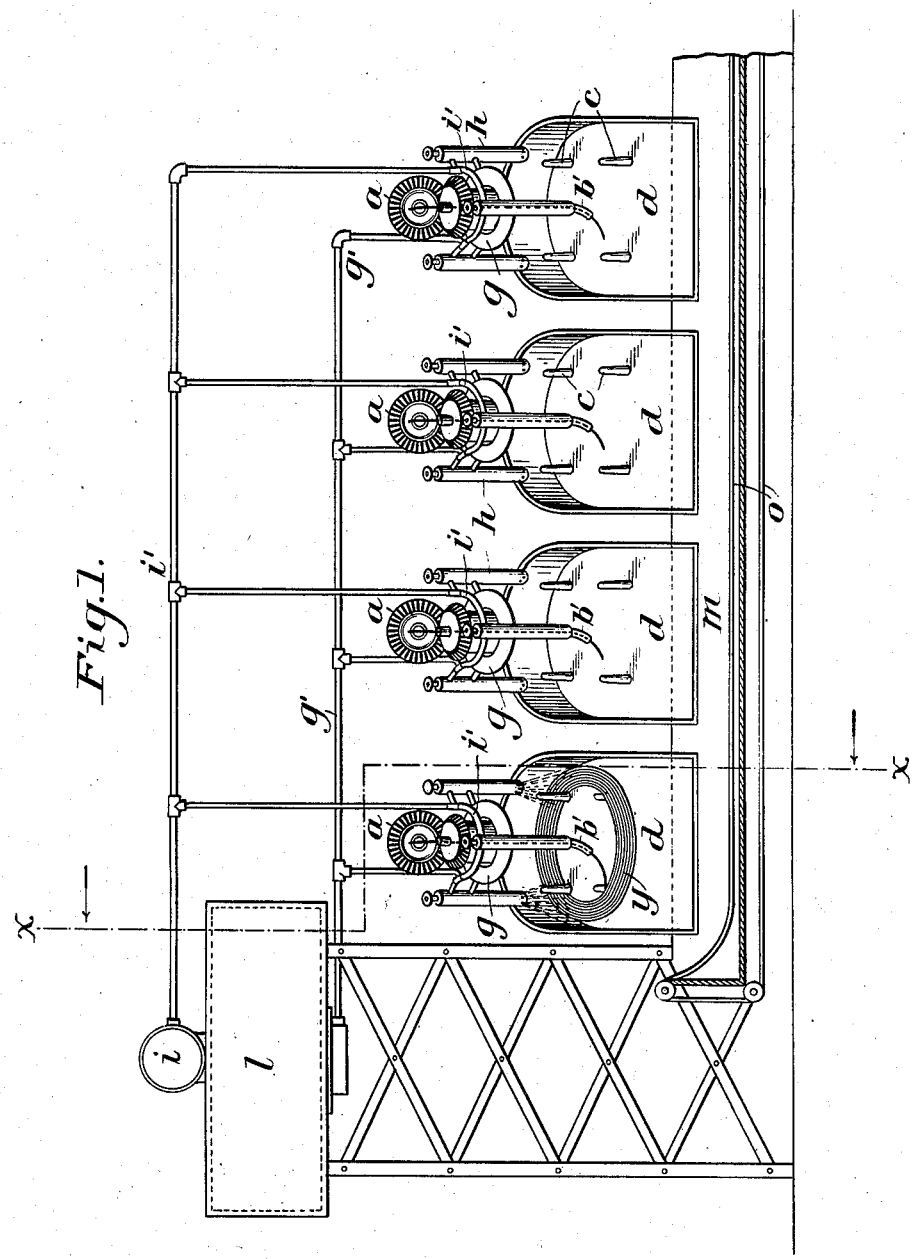
Figure 2:
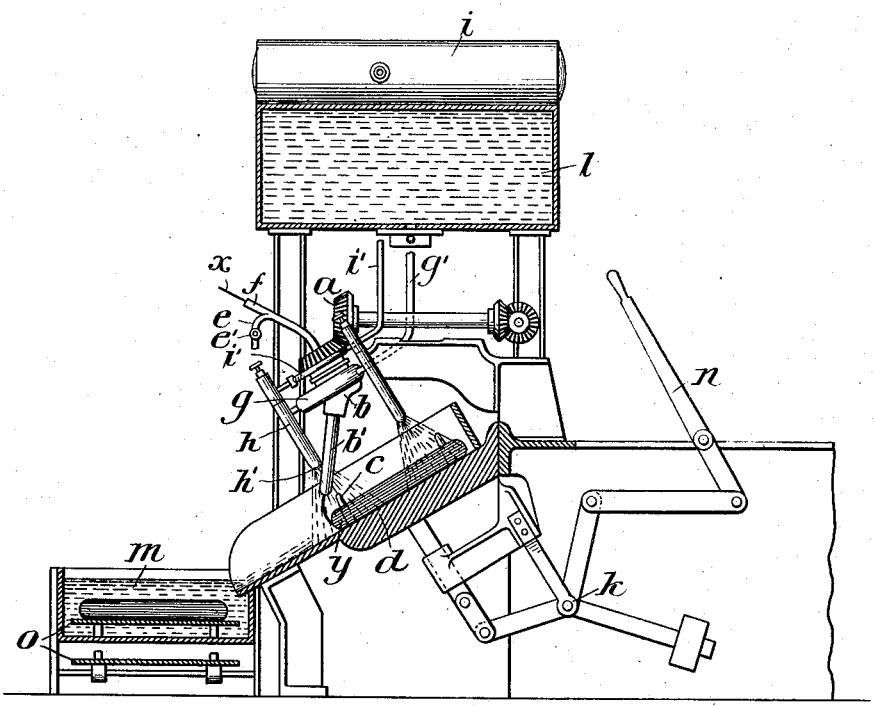
Figure 6:
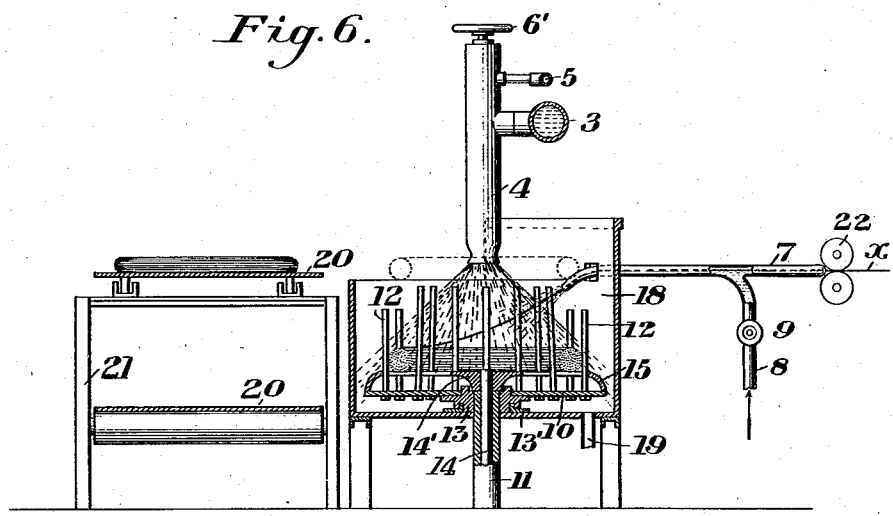
Figure 7:
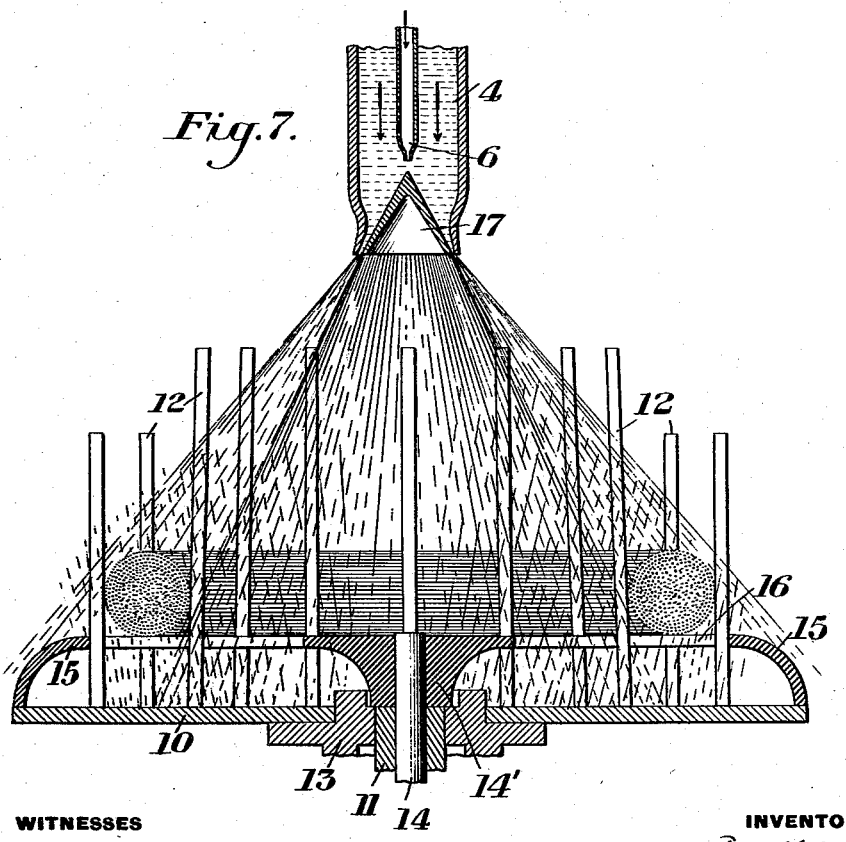
Figure 8:
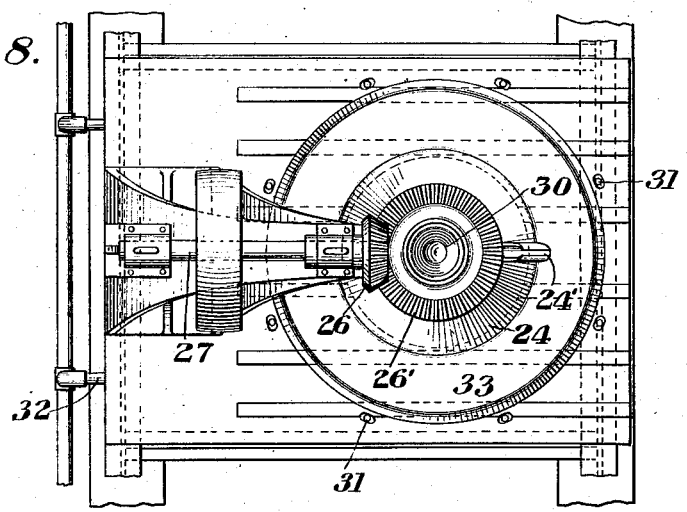

Figure 1 is a front elevation, partly in section, of a coiling plant adapted for the practice of my invention; Fig. 2 is a cross section of Fig. 1, taken on the line $x$—$x$ thereof; Fig. 3 is a side elevation of the automatic coiler, partly in section, and of the spraying mechanism, also partly in section; Fig. 4 is a plan view of the spraying mechanism; Fig. 5 is a side elevation, partly in section, showing a modified apparatus; Fig. 6 is an end view of Fig. 5, and Fig. 7 is a central vertical section on a larger scale of one of the reels and spraying nozzles. Fig. 8 is a plan view; and Fig. 9 a central vertical section of another form of apparatus which may be employed.

My invention relates to the manufacture of wire rods, and more particularly consists in improved means for cooling the same and preventing the formation of scale thereon as they come from the finishing mill. The wire rods, as they come hot from the mill, are coiled or "reeled," and, in order to prevent too heavy scale forming while the coil is cooling in the open air, it has heretofore been the custom, in some cases, to cool them by immersing them in water immediately after the coiling operation. This operation, however, seems too violent for the highly heated rods, and results in chilling and hardening them to an injurious degree and it is the purpose of this invention to effect the cooling by a milder process that may either be employed as preliminary to the usual immersion, or may be the only cooling to which they are subjected.

In the practice of my invention I create around the rods, during the operation of coiling, a non-oxidizing atmosphere of steam and finely-divided moisture by spraying the coil with water as it is being formed, the water being divided up into minute particles by the relative rotary movement between the spraying nozzles and parts of the coiler. The mechanism by which this operation may be carried out, as well as further details of the operation and of the advantages secured by their use will be apparent from the following detailed description.

Referring particularly first to Fig. 3 of the drawings, the finished wire $x$ is delivered through the pipe $f$ to the rotating tubular arm $b'$ of the automatic coiler $b$, which may be of usual construction, said arm being rotated by the bevel gears $a$, $a$. The rod is thus wound in a coil upon the inclined platform $d$, through which project pegs or pins $c$, which are adapted to be retracted by lever mechanism $k$ and handle $n$, which may be constructed in any usual way and which will be clearly understood from an inspection of Fig. 2. When the coil or bundle $y$ is completed, the pins $c$ are withdrawn and the bundle $y$ slides by gravity off said platform onto a suitable supporting surface, which may, as shown, be a conveyer $o$, running in a tank or water bath $m$, for finally cooling the rod so that it can be handled, after having been, by means of the spraying process described above, cooled to a temperature below the critical point at which the metal may be hardened or tempered. This final cooling may or may not be used, and the coil may be delivered to a conveyer or stationary platform without the addition of a water tank. From a suitably located reservoir $l$ or other source I extend a system of piping $g'$ which communicates with hollow supply heads $g$, one of said supply heads being located adjacent to, and partially encircling each coiler $b$. To each of said heads are secured a plurality of atomizer nozzles $h$, three being shown in the drawing, which are located so as to direct the sprays issuing from them upon the rods as they are wound, by the coiler $b$, around the pins $c$ on the platform $d$. The ends of the atomizers $h$ are provided with small apertures $h'$ and the water is caused to issue therefrom with considerable force in a fine spray by means of air, steam or other gaseous fluid under pressure delivered from a reservoir $i$, through pipes $i'$ to a nozzle $j$, axially located within each atomizer $h$. A needle valve $i^2$, at the upper end of each nozzle $j$ controls the pressure in each atomizer. The pipes $f$ through which the rod $x$ is fed to the coiler and the coiler arm $b'$ may also be utilized as a water passage. I have shown a branch pipe $e$, provided with a cock $e'$, and leading into the pipe $f$ for this purpose. I do not confine myself to a nozzle constructed according to the above description; any suitable spraying nozzle may be used.

The operation will now be described. The wire as it comes from the rolls is guided by the pipe $f$ into the coiler and by the latter is laid around the pins *c*. The water issuing in fine sprays from the atomizers *h* is still more finely divided by the impact of the revolving arm *b'* and the wire issuing therefrom. As soon as a sufficient number of turns of wire have been coiled around the pins *c*, the cock *e'* is opened admitting water to the pipe *f* and revolving arm *b'*, and as said water issues from the end of said arm, it mingles with the sprays from the atomizers *h*, the result being to spray or atomize still further the water coming from both sources. As the water, in this finely-divided condition, strikes the hot wire in the coil, steam is formed, which, coupled with the fine mist pervading the entire platform *d*, effectually prevents the oxidation of the wire while at the same time cooling the same sufficiently gradually to prevent a chilling or hardening action. When the coil is completed, the pins *c* are withdrawn and the coil slides off the platform *d* preferably into the bath *m* and onto the conveyer *o*.

It is to be noted that the water issuing from the revolving arm *b'* strikes the coil and the platform on which it is being formed with considerable force, and is broken up into minute particles similar to those issuing from the spray nozzles or atomizers *h*. This action is greatly facilitated by the rotation of the arm *b'*, causing the jets to strike the pins *c*, the coil itself, and other parts of the apparatus, which, though actually stationary, are relatively movable with respect to the water which is thus projected upon them, and cause the fine stream of water to rebound and be further broken up so as to be the more easily converted into steam by the heat of the coil.

In the apparatus shown in Figs. 5, 6 and 7, which is designed to perform the operations stated, the reel itself is rotated and preferably a single stationary nozzle is employed for spraying the coil. In this case there is the same breaking up and fractional distribution of water as in my companion invention filed herewith, but it is believed that the present apparatus produces better and quicker results, owing, among other things, to the fact that the projection of a stationary spray upon a positively moving surface appears to break up or subdivide and distribute the water more thoroughly and effectively than when the spray moves and the parts on to which it is projected are stationary.

Referring to Figs. 5, 6 and 7, 1 represents a tank or reservoir for water and 2 a reservoir for compressed air or other gaseous fluid. A pipe 3 leading from the former communicates with spraying nozzles or atomizers 4. A pipe 5 leading from the latter communicates with nozzles 6 axially located in said atomizers. The pressure in said pipe 5 may be controlled as heretofore described by needle valves adapted to be manually controlled, as by the means indicated at 6'. The pipes for guiding the wires as they come from the finishing mill are indicated at 7, and with them communicate branch pipes 8, provided with cocks 9, by which a stream of water can be fed through each of said pipes 7 with the wire. As each coiling and cooling mechanism is an exact duplicate of the other, I will describe the construction of one only. The wire, as it comes from the pipe 7, is fed to the coiling mechanism, which in this case is the reel itself, comprising the rotary base 10 attached to and driven by the shaft 11 and carrying the pins or pegs 12. To the shaft 11 is attached the hub 13 of the base plate 10, and said hub is supported on an annular bearing 13'. The shaft 11 is hollow and has a rod 14 extending through it, to the upper end of which is attached the hub 14' carrying the coil supporting plate or grid 15 which is slotted as at 16 for the passage of the pins 12, and which is pushed up in a well-known manner, to raise the coil above the pins when it has been completed and is ready to be discharged. The spraying nozzle 4 has an inverted cone 17 at its open end so that only a narrow adjustable annular aperture is left for the egress of the water, which, owing to the conical shape of the passage leading to said aperture, is sprayed onto the coil in the form of a hollow cone, as will be apparent from an inspection of Fig. 7, and is delivered in the form of a ring or circle approximating that of the coil. The entire coiling mechanism is contained within a casing 18 provided with an aperture for the pipe 7 and with a drain pipe 19 for the water. When the coil is completed, the rod 14 is raised by any suitable means, not shown, and lifts, by means of the plate or grid 15, the coil above the upper ends of the pins 12, and the coil is then removed from said plate onto a conveyer 20, or other suitable supporting surface, such a conveyer and its support 21 being diagrammatically represented in Figs. 5 and 6, and which may run in a tank of water for finally cooling the coil, if preferred.

The operation will now be described. The wire *x* coming from the rolls 22 of the finishing mill, is guided into the pipe 7 and issuing therefrom is engaged by the pins 12 of the revolving reel. As soon as a sufficient number of turns have been made to cause the necessary frictional engagement of the wire with the pins, the cock 9 is opened and a stream of water is fed into said pipe along with the wire. This stream strikes the revolving coil and the base and pins of the coilers and also strikes the conical spray coming from the nozzle 4 and mingles therewith, and owing to their impact together and to their striking the revolving base 10 of the coiler and the grid 16 and pins 12, and other moving parts adjacent to the coil, the water is delivered onto the hot coil in a finely-divided state, the result being the formation of an atmosphere of steam, and mist, which gradually cools the coil while preventing the formation of oxid.

Figure 9:
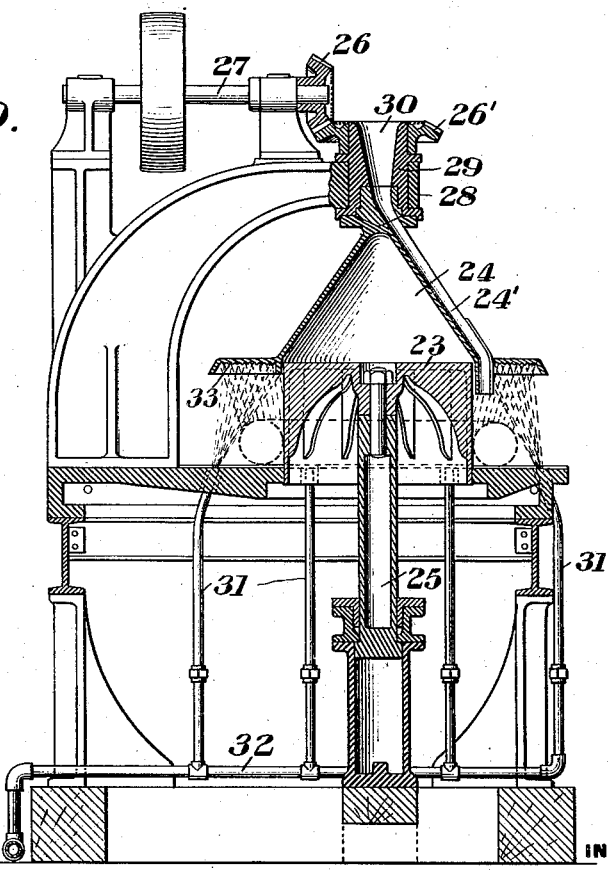

In the modification shown in Figs. 8 and 9 the wire rod is coiled upon the drum or reel 23 by means of the rotary coiling device 24 having the rod guide 24'. The drum or reel 23 is adjustably supported on the post or shaft 25, and the rotary coiling device 24 is driven by the gears 26 and 26' from the shaft 27. The coiling device 24 is journaled in the overhanging bearing 28, and its journal 29 is formed with the aperture 30 which communicates with the wire guide 24'. 31 designates a series of water pipes which are placed in a circle below the drum 23 with their upper ends terminating outside of and below the coil or wire wound on said drum, and supplied by suitable pipe 32. The water from these pipes is spouted up against the under side of the deflecting plate 33, and is reflected down from the coil, the rough or corrugated under surface of said plate causing the water to spread over every part of the coil. The water being deflected onto the coil in this manner instead of being sprayed directly upon it, there is a more uniform distribution of the water-cooling effect.

Within the scope of my invention as herein claimed, the apparatus may be modified in many ways, since

What I claim is:—

1. The method herein described of treating wire rods, which consists in coiling a wire rod, while hot, and during the coiling operation subjecting it to a spray of water.

2. The method herein described of treating wire rods, which consists in coiling a wire rod while hot, and during the coiling operation subjecting it to an atmosphere of finely-divided spray.

In testimony whereof, I have hereunto set my hand.

FRED H. DANIELS.

Witnesses:
 GEO. SIEURIN,
 WM. A. BACON.